United States Patent
Tremblay et al.

(10) Patent No.: US 10,259,232 B2
(45) Date of Patent: Apr. 16, 2019

(54) METHOD FOR DETERMINING A PER-IMAGE RESOURCE CONSUMPTION IN A PRINTER

(71) Applicant: Océ Holding B.V., Venlo (NL)

(72) Inventors: Christian Tremblay, Mantes la Ville (FR); Stéphane Barizien, Charenton-le-Pont (FR)

(73) Assignee: OCE HOLDING B.V., Venlo (NL)

( * ) Notice: Subject to any disclaimer, the term of this patent is extended or adjusted under 35 U.S.C. 154(b) by 0 days.

(21) Appl. No.: 15/634,094

(22) Filed: Jun. 27, 2017

(65) Prior Publication Data

US 2018/0001653 A1 Jan. 4, 2018

(30) Foreign Application Priority Data

Jul. 4, 2016 (EP) .................................... 16177842

(51) Int. Cl.
*B41J 2/175* (2006.01)
*G03G 15/00* (2006.01)
*G06K 15/00* (2006.01)

(52) U.S. Cl.
CPC ........ *B41J 2/17566* (2013.01); *G03G 15/556* (2013.01); *G06K 15/4075* (2013.01)

(58) Field of Classification Search
CPC .... G05B 19/4086; G05B 2219/40; B25J 9/16; B25J 9/10; B25J 13/02; B25J 13/00; G06F 19/00
See application file for complete search history.

(56) References Cited

U.S. PATENT DOCUMENTS

| | | | |
|---|---|---|---|
| 8,047,626 B1 | 11/2011 | Derhak et al. | |
| 2001/0021031 A1* | 9/2001 | Hashimoto | .......... H04N 1/2307 358/1.9 |
| 2006/0203277 A1 | 9/2006 | Suzuki | |
| 2013/0101328 A1 | 4/2013 | Morovic et al. | |
| 2015/0062634 A1 | 3/2015 | Saiki | |

OTHER PUBLICATIONS

European Search Report for EP 16 17 7842 completed on Jan. 3, 2017.

* cited by examiner

*Primary Examiner* — Henok D Legesse
(74) *Attorney, Agent, or Firm* — Birch, Stewart, Kolasch & Birch, LLP

(57) ABSTRACT

A method for attributing an amount of resource consumption to an individual printed image that is printed in a printer comprising a print job controller and a print engine, wherein the print job controller is configured to compile a print job that comprises at least two images to be printed, the print job controller comprising an estimation section arranged to estimate a respective amount of resource consumption for each of the at least two images on the basis of print data that define the images, the method comprising the steps of: a) compiling a print job with at least two images; b) printing at least a part of each of the at least two images while monitoring a total amount of resource consumption; c) estimating the amount of resource consumption for the printed part of each of the at least two images on the basis of the print data; and d) proportioning the monitored total amount in proportion to the estimated amounts.

9 Claims, 2 Drawing Sheets

METHOD FOR DETERMINING A PER-IMAGE RESOURCE CONSUMPTION IN A PRINTER

BACKGROUND OF THE INVENTION

1. Field of the Invention

The invention relates to a method for attributing an amount of resource consumption to an individual printed image that is printed in a printer comprising a print job controller and a print engine, wherein the print job controller is configured to compile a print job that comprises at least two images to be printed, the print job controller comprising an estimation section arranged to estimate a respective amount of resource consumption for each of the at least two images on the basis of print data that define the images. More particularly, the invention relates to a method for accurately determining a per-image ink consumption in an ink jet printer.

2. Description of the Related Art

In the printing industry, especially in the field of wide format graphic arts printing, it is quite common that two or more images which have been ordered by different entities are printed simultaneously or in overlapping time intervals on a common wide format media sheet in order to utilize the available recording media and the capacity of the printer as efficiently as possible. A print job controller, being any computing device or network of devices, may be configured to nest the two or more images into a single print job and thus communicate the image data to a print engine connected to the print job controller. The individual images, once they have been printed, will be cut to size and will be delivered to the entities who have ordered them, and these entities will be charged individually for the printing costs of their images. It is therefore desirable that the consumption of resources such as ink, media sheet material, energy and the like, can be determined on a per-image basis.

In patent application US 2001/021031 A1 a method is described for estimating an amount of toner to be consumed in outputting an image. If an available amount of toner is less than this estimated amount, image degradation is minimized by correcting the image data. U.S. Pat. No. 8,047,626 B1 describes another method of the type indicated above. Herein the amount of ink that has been used for an individual image is determined on the basis of the ink coverage of the image area as specified by the print data. However, since the relation between the ink coverage and the consumption of ink depends on several factors such as the thickness of the ink layer in the printed ink dots, overlap of neighboring ink dots and the like, this method permits only a relatively rough estimate of the amount of actual ink consumption.

In principle, a more exact result can be obtained by measuring the actual consumption of ink during the print process. However when two or more images are printed at a time, it is not clear how the measured amount of ink has to be allocated to the different images.

It is an object of the invention to provide a method for attributing an amount of resource consumption to individual printed images with improved accuracy.

SUMMARY OF THE INVENTION

In order to achieve this object, the method according to the invention comprises the steps of: a) compiling a print job with at least two images; b) printing at least a part of each of the at least two images while monitoring a total amount of resource consumption; c) estimating the amount of resource consumption for the printed part of each of the at least two images on the basis of the print data; and d) proportioning the monitored total amount in proportion to the estimated amounts.

Thus, although the amount of resource consumption per image cannot be measured directly and must still be estimated, the invention permits an improvement in accuracy by calibrating the estimates on the basis of the total amount of resource consumption for the plurality of images, which amount can be measured with high accuracy. In this way, the invention also assures that the amount of resource consumption that is billed to the clients is consistent with the actual amount of resource consumption that has been obtained through measurement.

More specific optional features of the invention are indicated in the dependent claims.

In one embodiment, the monitored total amount of resource consumption may be determined at a time when a print job is completed, and the amount thus determined will then be proportioned in accordance with the estimates. It is not compulsory, however, that the print job consists only in printing a number of images that are printed simultaneously and/or on a common media sheet. Instead, a print job may be defined to comprise the larger number of images at least some of which are printed at non-overlapping timings and/or on different media sheets.

The invention is also applicable in cases where, for some reason, a print job must be aborted before all images have been completed. In this case, estimates for the resource consumption will be made not for the entire images but only for those parts of the images that have been printed before the process was aborted. The estimates may be based on the respective original estimates for the complete images and a percentage of area of the printed part in relation to the total image area. In another embodiment, the estimates may be based directly on the print data for those parts of the images that have been printed.

BRIEF DESCRIPTION OF THE DRAWINGS

Embodiment examples will now be described in conjunction with the drawings, wherein.

Figure 1:
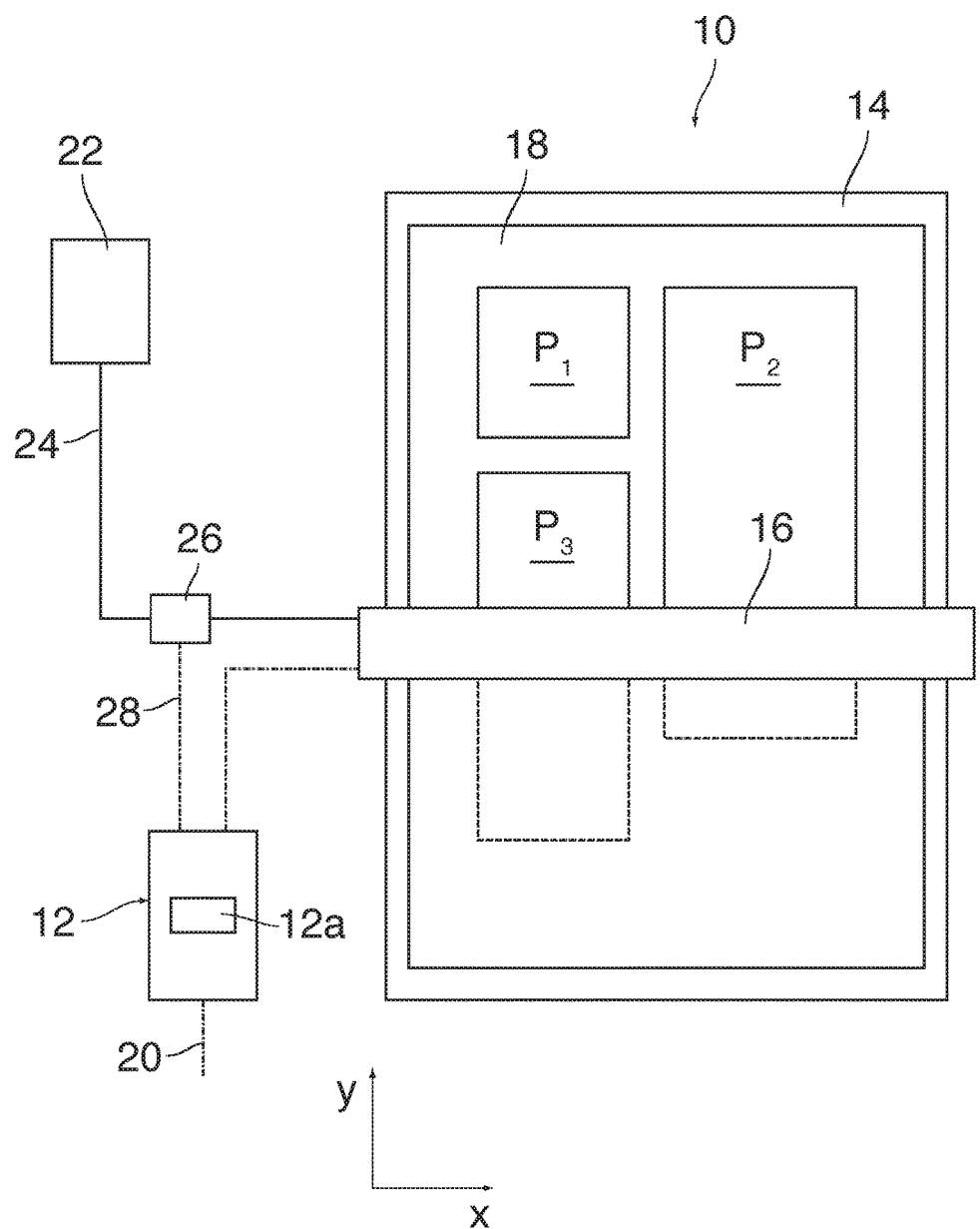
FIG. 1 is a diagram of a printer that is suitable for executing the method according to the invention.

The printer shown in FIG. 1, a flatbed ink jet printer in this example, comprises a print engine 10 and an electronic print job controller 12.

DETAILED DESCRIPTION OF EMBODIMENTS

The present invention will now be described with reference to the accompanying drawings, wherein the same or similar elements are identified with the same reference numeral.

The print engine 10 has a print surface 14 and a print head 16. In this example, the print head 16 is assumed to be a page-wide print head which extends over the entire width of the print surface 14 in a first direction x and which is movable relative to the print surface 14 in a second direction y. Of course, other embodiments are possible where the print head 16 is stationary and media sheets are advanced over the print surface 14 in the second direction y, or the print head may be movable in the first direction x (main scanning direction) along a gantry and the gantry may be movable in the second direction y (sub-scanning direction).

FIG. 1 illustrates a situation where a media sheet 18 has been placed on the print surface 14 and the print head 16 moves over the print surface in −y-direction and has printed already an image $P_1$ as well as parts of two further images $P_2$ and $P_3$. The parts of the images $P_2$ and $P_3$ that have been printed already are indicated in continuous lines, whereas those parts which still have to be printed are indicated in dashed lines. The images $P_1$ and $P_3$ are located in the same position in x-direction and are printed one after the other, whereas the image $P_2$ is offset from the images $P_1$ and $P_3$ in x-direction, so that the time intervals in which the print head 16 prints the images $P_1$ and $P_3$ overlap with the time in which the image $P_2$ is printed.

The print job controller 12 is an electronic data processing system and has a network link 20 via which it can receive image data and printing instructions and can send status information, billing information and the like. The print job controller 12 is connected to the print head 16 and is configured to convert image data into print data and to compile print jobs on the basis of the received image data and printing instructions and to control the operation of the print engine 10. In the example shown, the print job compiled by the print job controller 12 consists of the images $P_1$, $P_2$ and $P_3$.

By way of example, it is assumed here that the print head 16 receives liquid ink from an ink source 22 via an ink supply line 24. The ink supply line 24 contains an ink consumption measuring system 26 which may for example be constituted by a flow meter which is connected to the print job controller 12 by a signal line 28 and transmits to the print job controller 12 an ink consumption signal that is indicative of the instantaneous flow rate of the ink in the ink supply line 24. Provided that the print head and the ink supply line 24 downstream of the flow meter do not provide a variable buffer volume for the ink, the ink consumption signal transmitted to the print job controller 12 will represent the actual instantaneous ink consumption of the print head 16. Alternatively, the ink consumption measuring system may be configured to count a number of ink droplets actually discharged by the print head 16 and transmit the total number of ink droplets applied in the print job to the print job controller.

The print job controller 12 integrates the ink consumption signal, so that, when the print job is completed, which means in this case that the entire area of the image $P_3$ has been printed, the total amount of ink consumption for the three images $P_1$, $P_2$ and $P_3$ is known with high accuracy.

However, the ink consumption measuring system 26 can provide only the total amount of ink that has been consumed during a given time interval, but it cannot provide information as to how much of the total ink consumption has to be attributed to the image $P_1$, how much to the image $P_2$, and how much to the image $P_3$.

In order to attribute the image consumption to each individual image, the print job controller 12 has an estimation section 12a which analyses the image data that have been received via the link 20 and calculates, for each of the images to be printed, an estimated amount of ink consumption on the basis of the image contents. For example, the estimation section 12a counts the number of pixels to be printed for each image and multiplies this number with a factor that is looked up from a table and indicates the expected amount of ink consumption for an individual pixel.

When estimates for the amount of ink consumption for each of the images $P_1, P_2$ and $P_3$ have been obtained in this way, it may (and normally will) turn out that, due to unavoidable inaccuracies in the estimates, the sum of the estimated amounts of ink consumption for the three images does not match the total amount that has been measured by the measuring system 26. Then, in order to obtain a more accurate amount of ink consumption for each image, the estimates are calibrated on the basis of the ratio between the measured amount and the sum of the estimates.

The amount of ink consumption that is obtained in this way for each individual image may be used in the print job controller 12 for calculating the costs for the ink that has been consumed and for billing the customer who has ordered the image.

Of course, when the printer is a color printer, the procedure described above is performed separately for each ink color that is used in the print head 16.

In a modified example, the print head may be a hot melt ink jet print head to which ink is supplied in the form of solid pellets. Then, the ink consumption measuring system 26 may comprise a mechanism that counts the ink pellets supplied to the print head. As a consequence, the total amount of ink consumption can be measured only with an accuracy corresponding to the volume of an individual pellet. In order to improve the accuracy in determining the per-image ink consumption, it is possible, however, to measure the actual ink consumption (number of pellets) for a larger print job that consists of a plurality of images that may be printed on a plurality of media sheets 18. Then, the total amount of ink consumption for the print job will be larger, and the relative error induced by the finite volume of a pellet in relation to the total ink consumption will be smaller.

Figure 2:
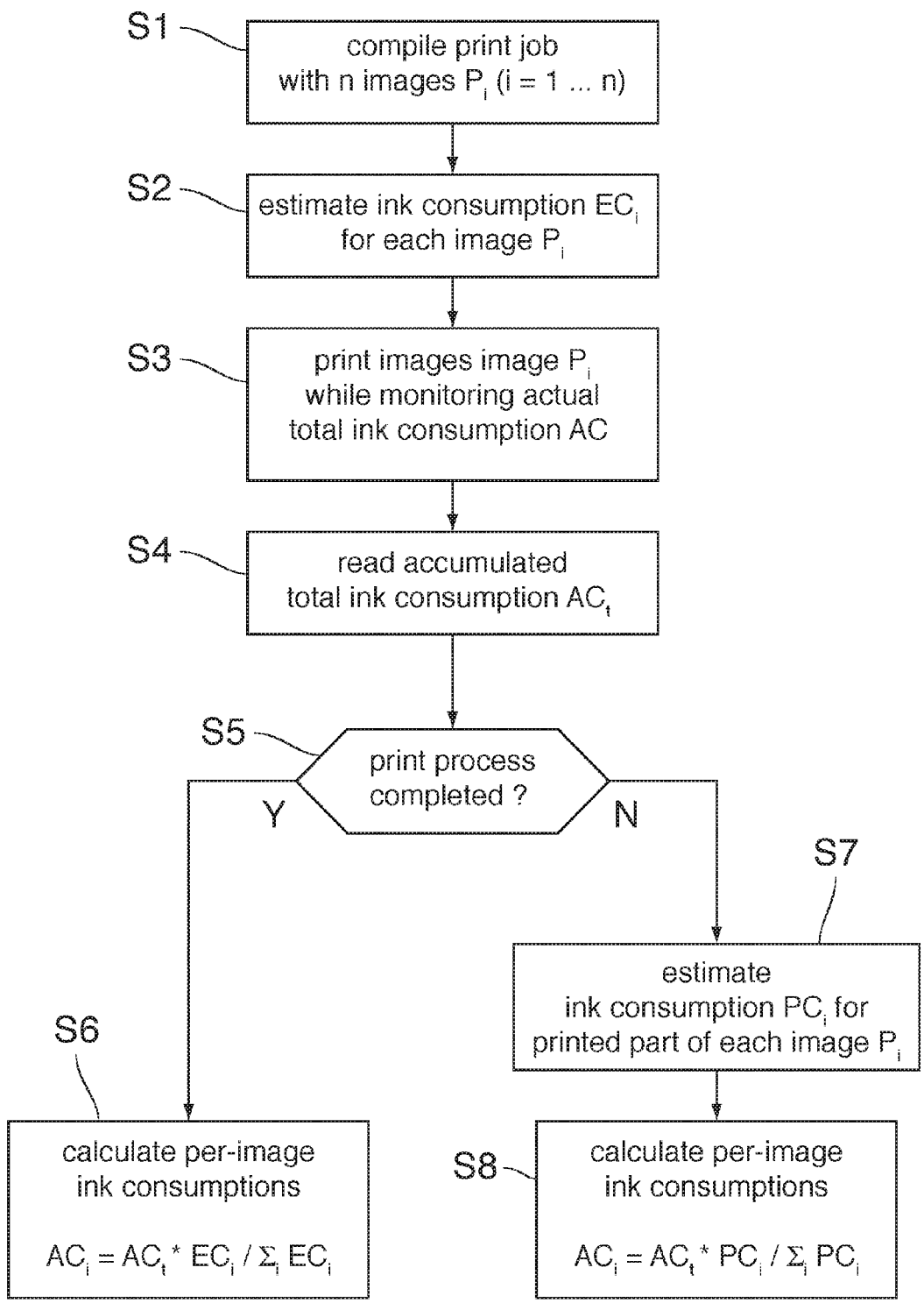
FIG. 2 is a flow diagram illustrating a method according to the invention.

A more specific embodiment example of the method according to the invention will now be described by reference to the flow diagram shown in FIG. 2.

In step S1, the print job controller 12 compiles a print job consisting of a number n of images $P_i$ which are to be printed on a single media sheet or a plurality of media sheets.

In step S2, the print job controller 12 calculates an estimate for the ink consumption $EC_i$ for each individual image $P_i$ on the basis of the print data that define the image $P_i$.

Then, in step S3, the print job is executed by printing all the images $P_i$ while monitoring the actual total ink consumption AC (per color) with the ink consumption measuring system 26.

When the operation of the print engine 10 stops, the accumulated total ink consumption $AC_t$ as measured by the measurement system 26 is read in step S4.

Then, it is checked in step S5 whether the print process has been completed, i.e. whether all the images belonging to the print job have been printed completely.

If this is the case (Y), the per-image ink consumptions $AC_i$ for each individual image $P_i$ are calculated in step S6 in accordance with the formula:

$$AC_i = AC_t * EC_i / \Sigma_i EC_i \qquad (1)$$

If it is found in step S5 that the print process was not completed (N), this means that the print process has been aborted for some reason. In this case, estimates for the ink consumption $PC_i$ are calculated in step S7. However, these estimates $PC_i$ relate only to the parts of each image that had been printed already at the time of abortion.

The estimates in step S7 may be based for example upon the area ratio between printed and non-printed parts of each image. In the example shown in FIG. 1, the image $P_1$ has been printed to 100%, so that $PC_1=EC_1$. The image $P_2$ has been printed to 75%, so that $PC_2=0.75*EC_2$. The image $P_3$ has been printed to 50%, so that $PC_3=0.5*EC_3$.

In another embodiment, the estimates made in step S7 may be based directly on the image contents, similarly as the estimates in step S2, but only for a limited area of the image corresponding to the part that has been printed.

Based on the estimates made in step S7, the per-image ink consumptions for each (possibly incomplete) image are calculated in step S8 in accordance with the formula:

$$AC_i = AC_t * PC_i / \Sigma_i PC_i. \quad (2)$$

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A method for attributing an amount of resource consumption to an individual printed image that is printed in a printer comprising a print job controller and a print engine, the print job controller being configured to compile a print job that comprises at least two images to be printed and the print job controller comprising an estimation section arranged to estimate a respective amount of resource consumption for each of the at least two images on the basis of print data that define the images, the method comprising the steps of:
    a) compiling a print job with at least two images;
    b) printing at least a part of each of the at least two images while monitoring a total amount of resource consumption;
    c) estimating an amount of resource consumption for the printed part of each of the at least two images on the basis of the print data; and
    d) attributing the monitored total amount of resource consumption used for printing the at least two images to each of the at least two images in proportion to the estimated amounts.

2. The method according to claim 1, wherein the steps of estimating the amount of resource consumption and attributing the monitored total amount are performed when the print job is completed.

3. The method according to claim 1, wherein the step of estimating the amount of resource consumption and the step of proportioning the monitored total amount are performed when the print job is aborted, and the step of estimating comprises estimating an amount of resource consumption only for the part of each image that has been printed before the print job was aborted.

4. The method according to claim 3, wherein the estimate is based on an area ratio between the printed part and the non-printed part of the image.

5. The method according to claim 3, wherein the estimate is based on the print data for the printed part of the image.

6. The method according to claim 1, wherein the step of compiling the print job comprises specifying image areas for at least two images to be printed on a common media sheet, and the step of printing comprises printing at least a part of each of said at least two images simultaneously.

7. The method according to claim 1, wherein an amount of resource consumption attributed to each of the at least two images in the step d) is obtained based on a ratio between the monitored total amount of resource consumption after a printing of the at least two images is completed and a sum of estimated amount of resource consumption for the at least two images in the step c).

8. A printer comprising a print job controller and a print engine, wherein the print job controller is configured to compile a print job that comprises at least two images to be printed, the print job controller comprising an estimation section arranged to estimate a respective amount of resource consumption for each of the at least two images on the basis of print data that define the images, wherein the printer comprises a resource consumption measuring system, and the print job controller is configured to perform a method comprising the steps of:
    a) compiling a print job with at least two images;
    b) printing at least a part of each of the at least two images while monitoring a total amount of resource consumption;
    c) estimating the amount of resource consumption for the printed part of each of the at least two images on the basis of the print data; and
    d) attributing the monitored total amount of resource consumption used for printing the at least two images to each of the at least two images in proportion to the estimated amounts.

9. A computer program product embodied on a non-transitory computer-readable medium, comprising program code which, when executed on a print job controller of a printer, the printer comprising a resource consumption measuring system, causes the print job controller to perform the steps of:
    a) compiling a print job with at least two images;
    b) printing at least a part of each of the at least two images while monitoring a total amount of resource consumption;
    c) estimating the amount of resource consumption for the printed part of each of the at least two images on the basis of print data that define the images; and
    d) attributing the monitored total amount of resource consumption used for printing the at least two images to each of the at least two images in proportion to the estimated amounts.

* * * * *